(12) United States Patent
Ng

(10) Patent No.: US 9,612,029 B2
(45) Date of Patent: Apr. 4, 2017

(54) AIRFLOW SYSTEMS

(71) Applicant: Shek Fat Bosco Ng, Wan Chai (HK)

(72) Inventor: Shek Fat Bosco Ng, Wan Chai (HK)

( * ) Notice: Subject to any disclaimer, the term of this patent is extended or adjusted under 35 U.S.C. 154(b) by 293 days.

(21) Appl. No.: 14/560,794

(22) Filed: Dec. 4, 2014

(65) Prior Publication Data

US 2016/0161141 A1    Jun. 9, 2016

(51) Int. Cl.
*F24F 11/00* (2006.01)

(52) U.S. Cl.
CPC ........ *F24F 11/0034* (2013.01); *F24F 11/006* (2013.01); *F24F 11/0012* (2013.01); *F24F 11/0076* (2013.01); *F24F 2011/0035* (2013.01); *F24F 2011/0061* (2013.01); *G05B 2219/2614* (2013.01)

(58) Field of Classification Search
CPC ............... F24F 11/0001; F24F 11/0009; F24F 11/0012; F24F 11/0034; F24F 11/0076; F24F 11/04; F24F 2011/0035; B60H 1/00742; G05B 2219/2614; Y02B 30/767
See application file for complete search history.

(56) References Cited

U.S. PATENT DOCUMENTS

| | | | | |
|---|---|---|---|---|
| 5,899,807 A * | 5/1999 | Kim | ...................... | F24F 11/0076 236/51 |
| 6,050,892 A * | 4/2000 | Sodec | ...................... | F24F 13/06 454/289 |
| 6,210,267 B1 * | 4/2001 | Long | ......................... | F24F 9/00 454/189 |
| 2008/0009237 A1 * | 1/2008 | Wu | ....................... | F24F 11/0009 454/256 |
| 2009/0065595 A1 * | 3/2009 | Kates | .................... | F24F 3/0442 236/49.3 |
| 2010/0330898 A1 * | 12/2010 | Daniels | ................... | F24F 7/025 454/365 |
| 2011/0077758 A1 * | 3/2011 | Tran | ....................... | A61B 5/002 700/94 |
| 2013/0281000 A1 * | 10/2013 | Newcomer | ............... | F24F 7/08 454/237 |
| 2015/0116200 A1 * | 4/2015 | Kurosawa | .............. | B60K 35/00 345/156 |
| 2015/0320588 A1 * | 11/2015 | Connor | ................. | A61F 7/0097 607/107 |

FOREIGN PATENT DOCUMENTS

| | | | |
|---|---|---|---|
| JP | 4911255 B1 | * | 4/2012 |
| JP | 2016044865 A | * | 4/2016 |

* cited by examiner

*Primary Examiner* — Crystal J Barnes-Bullock
(74) *Attorney, Agent, or Firm* — Matthew M. DiMaggio, Esq.

(57) ABSTRACT

According to embodiments of the invention, systems, methods and devices are directed to generating air flow in directions that are sensitive to surrounding objects. In one embodiment, a cooling system is provided. The system includes an air generator locating in an area of room temperature. The system also includes a position device in the air generator, a movable air vent, and a tracking sensor. Generally, the mobile cooling system is configured to detect a temperature of a human being and whether the human being moves from one location to another. Upon detection, a set of wheels is used to move the cooling device so that the vent of the cooling device is directed away from the object.

12 Claims, 5 Drawing Sheets

AIRFLOW SYSTEMS

FIELD OF THE INVENTION

This invention is generally related to cooling systems. More specifically, this invention is related to mobile cooling systems used to detect whether a human being or any object that has moved from one location to another and act accordingly.

BACKGROUND OF THE INVENTION

Ventilation systems are commonly used to generate air flow in an indoor environment. Cooling systems, such as air conditioners, are found in almost every household. For many ventilation systems, air vents are movable so that air flow can be distributed evenly in the given enclosed area. The air vents often rotate freely at different angles. As such, cooling systems can be used to generate air flow not just for one person but many persons. A cooling system can direct the air to blow at different directions. The current cooling systems, however, automatically direct the vent from one angle to another, in order to spread out cool air evenly.

There are circumstances, however, that it is less desirable to have the cool air flow directed to certain objects. One such example may come from those who are sick or the elderly. To those individuals, having cool air flow directly blowing in their directions may worsen their physical conditions. Thus, there should be ways to allow air ventilation systems to avoid such circumstances from happening. Furthermore, those with respiratory problems may have worsened symptoms result from the direction cold air flow.

Therefore, it is an objective of the disclosed technology to provide a smart cooling system which adjusts itself accordingly in order to maximize the comfort of those in a close proximity to the cooling system.

SUMMARY OF THE INVENTION

According to embodiments of the invention, systems, methods and devices are directed to generating air flow in directions that are sensitive to surrounding objects. In one embodiment, a cooling system is provided. The system includes an air generator located in an area of room temperature. The system also includes a position device in the air generator, a movable air vent, and a tracking sensor. Generally, the mobile cooling system is configured to detect a temperature of a human being and whether the human being moves from one location to another. Upon detection, a set of wheels is used to move the cooling device so that the vent of the cooling device is directed away from the object.

In an embodiment of the disclosed invention, an air-conditioning system is used for generating air flow in directions away from objects to prevent the objects from being directly hit with airflow. The system may employ one or more of the following components: a) an air generator having a temperature sensing unit; b) a position device in the air generator, wherein the position device is used to i) identify its current position, ii) remember a default position, and iii) return the air generator to return to the default position, when the air generator is denied access because of an obstruction; c) a movable air vent attached to the air generator, wherein the movable air vent directs air flow generated by the air generator; d) a tracking sensor associated with the air generator, wherein the tracking sensor is used to keep track of positions of the object, based on temperatures or heat generated by the object, and adjust the movable air vent in a direction away from the object; and e) a set of wheels affixed to the air generator, wherein the set of wheels facilitates movement of the air generator in response to movements of the object.

In a further embodiment of the disclosed system, the temperature sensing unit is an infrared sensor. The air generator may employ additional components such as a processor and memory. The memory may store instructions that cause the processor to execute a method. The method may be carried out, not necessarily in the following order, by: a) detecting whether the air generator needs to be activated, wherein the detection is made when the temperature reaches a threshold level as detected by the temperature sensing unit in the air generator, and it is detected that a object is within a specified distance to the air generator; b) turning on the air generator, after detection that the temperature reaches a certain level; and it is detected that the object is within the specified distance; and/or c) adjusting the air generator such that the movable air vent directs air flow away from the object. In a further embodiment, a position of the object is constantly monitored and air flow is maintained in a direction away from the object.

In a further embodiment of the system, further steps of the disclosed method may be carried out by: a) detecting that the object has moved to another location that is still within the specified distance using the tracking sensor; and/or b) adjusting the air vent of the air generator such that the movable air vent continues to face away from the object and is prevented from rotating to other positions whereby the object would receive the generated air flow.

Still further, additional steps may be carried out by: a) detecting that the object has moved to another location that is in the direction of air flow; and b) using the set of wheels to move the air generator such that the movable air vent of the air generator is directed away from the object. Alternatively, further steps may proceed by: a) detecting that the object has exited a specified proximity or area; and b) returning the air generator to the default position using the position device in the air generator.

In another embodiment of the disclosed technology, a method is used for generating air flow in directions away from objects to prevent the objects from being directly hit with airflow. The method is carried out, not necessarily in the following order, by: a) detecting whether an air generator needs to be turned on, wherein the detection is made when a room temperature reaches a certain level as detected by a temperature sensing unit in the air generator; and it is detected that an object is within a certain distance of the air generator; b) turning on the air generator, after detection that the room temperature reaches a certain level; and it is detected that the object is within a certain distance; c) adjusting the air generator, so that a movable air vent attached to the air generator is facing away from the object while preventing the air generator from rotating to other positions whereby the object would receive the generated air flow; d)detecting whether the object has moved to another location that is still within the certain distance using a tracking sensor; and/or e) upon detection that the object has moved to the another location that is still within the certain distance, adjusting the air vent of the air generator so that the movable air vent will continue facing away from the object while preventing the air generator from rotating to other positions where the object would receive the generated air flow.

In further embodiments, additional steps are carried out by: a) detecting whether the object has moved to a location within a range and direction of the generated air flow; and b) upon detection that the object has moved, using the set of wheels to move the air generator so that the movable air vent of the air generator is directed away from the object.

Still further, other aspects of the disclosed method may be carried out by: a) detecting that the object has exited a room and closed a door thereto; and b) returning the air generator to the default position using the position device in the air generator.

In still a further embodiment, the method may have additional steps which are carried out by detecting whether another location entered is a room whose door has been closed by the object. If it is detected that the another location entered is the room whose door has been closed, returning the air generator to the default position, by relying on the position device in the air generator; otherwise, adjusting the air vent of the air generator, so that the movable air vent is facing away from the object, while preventing the air generator from being rotated to other positions where the object would receive the generated air flow.

In accordance with these and other objects which will become apparent hereinafter, the invention will now be described with particular reference to the drawings.

DETAILED DESCRIPTION

According to embodiments of the invention, systems, methods and devices are directed to generating air flow in directions that are sensitive to surrounding objects. In one embodiment, a cooling system is provided. The system includes an air generator located in an area of room temperature. The system also includes a position device in the air generator, a movable air vent, and a tracking sensor. Generally, the mobile cooling system is configured detect a temperature of a human being and whether the human being moves from one location to another. Upon detection, a set of wheels is used to move the cooling device so that the vent of the cooling device is directed away from the object.

Any of the features of the various embodiments described herein can be used in conjunction with features described in connection with any other embodiments disclosed unless otherwise specified or apparent from context.

In an embodiment of the disclosed invention, an air-conditioning system is used for generating air flow in directions away from objects to prevent the objects from being directly hit with airflow. The system may employ one or more of the following components: a) an air generator having a temperature sensing unit; b) a position device in the air generator, wherein the position device is used to i) identify its current position, ii) remember a default position, and iii) return the air generator to return to the default position, when the air generator is denied access because of an obstruction; c) a movable air vent attached to the air generator, wherein the movable air vent directs air flow generated by the air generator; d) a tracking sensor associated with the air generator, wherein the tracking sensor is used to keep track of positions of the object, based on temperatures or heat generated by the object, and adjust the movable air vent in a direction away from the object; and e) a set of wheels affixed to the air generator, wherein the set of wheels facilitates movement of the air generator in response to movements of the object.

The "object", for purposes of this specification, may be any living thing. That is, in a typical embodiment, the object is a human being, and the system is employed to prevent direct flow of air (i.e. drafts) from being directed onto the human. Many humans, animals and plants may be adversely affected in a number of ways by the direct flow of cold air onto them. As such, "object" should hereinafter be understood to mean anything which conceivably would be sought to be removed from or placed into the direct flow of an air generating system, such as, for example, an air conditioner. As such, an "air generator" and/or an "air cooling system" may be any system or device which accelerates and/or cools air particles for purposes of adjusting ambient climate and/or temperature in specified area, dwelling, room, or other space.

Figure 1:
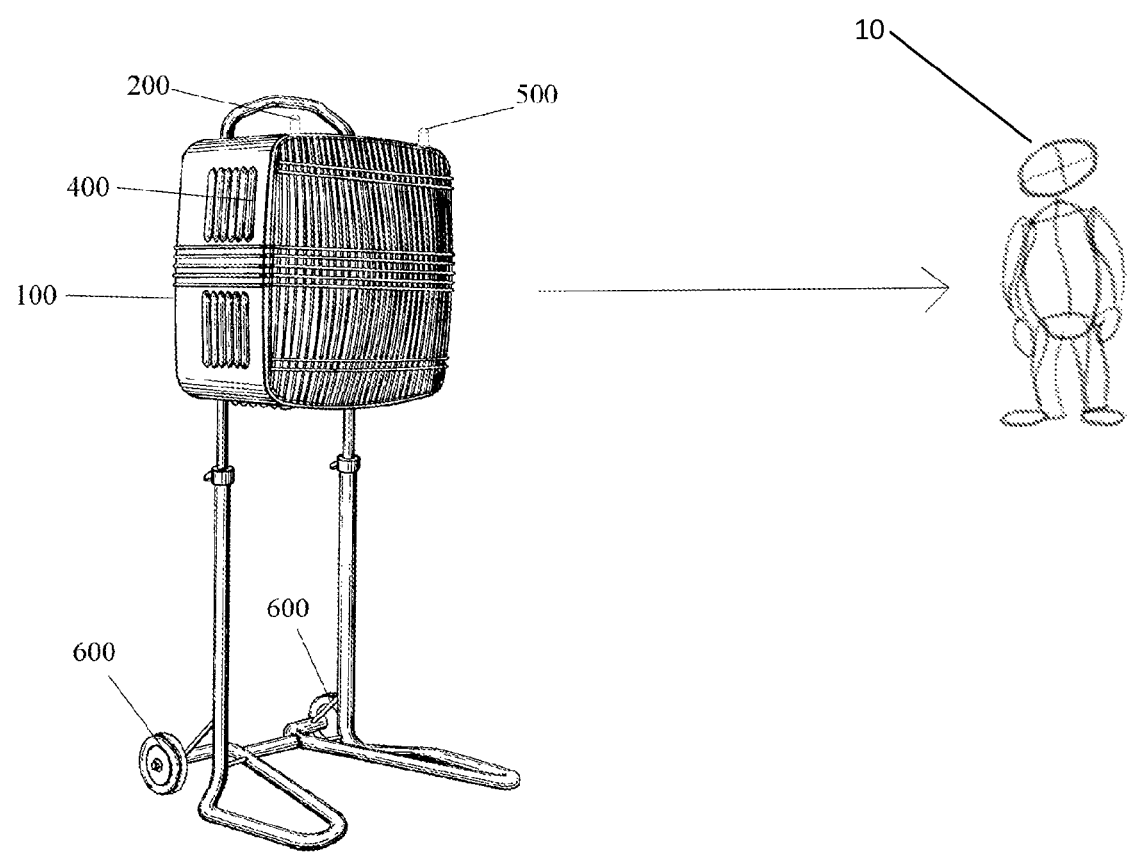
FIG. 1 shows a perspective view of a cooling system with respect to a user according to an embodiment of the disclosed technology.

Referring now to the figures, FIG. 1 shows a perspective view of a cooling system with respect to a user according to an embodiment of the disclosed technology. An air generator 100 is depicted with a user 10 in close proximity thereto. The "user 10" may be the aforementioned "object" as described above. The air generator 100 may have one or more sensors 200, 500 disposed on a portion thereof. A position device 200 may identify and store a current position of the air generator. The store position data may later be referred to in order to return the air generator to an original or default position. A tracking sensor 500 may be used track of positions of the object, based on temperatures or heat generated by the object. Additionally, the tracking sensor 500 may adjust the movable air vent in a direction away from the object.

Figure 2:
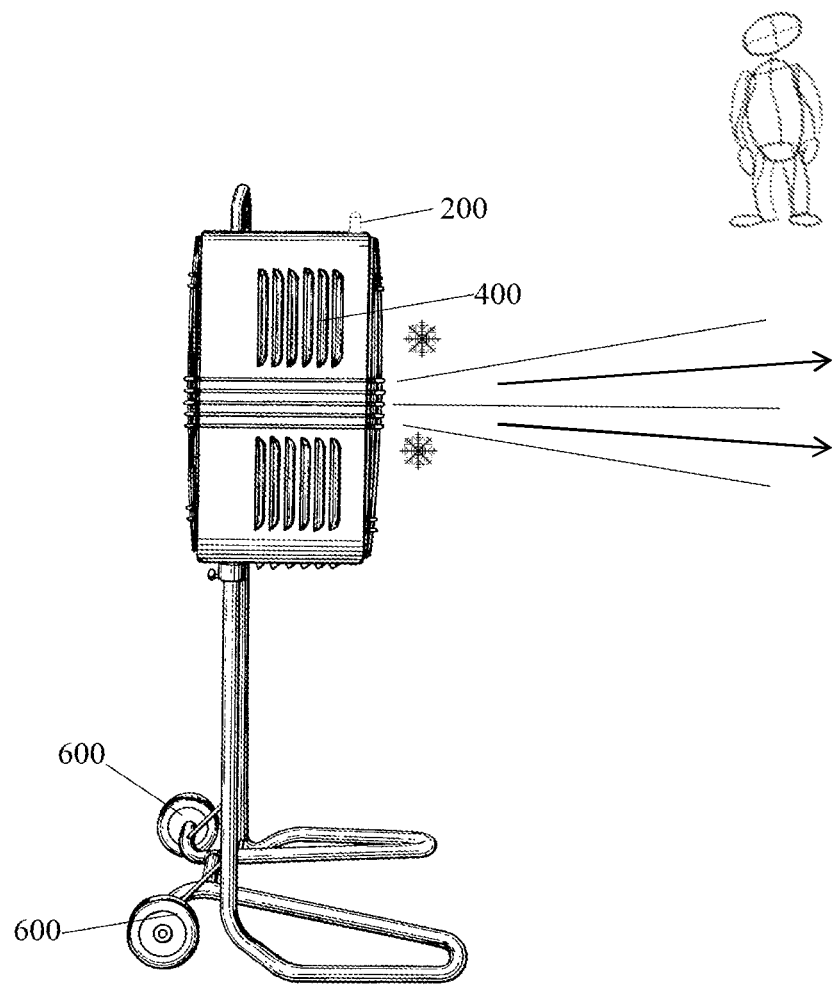
FIG. 2 shows a side elevation view of a cooling system with respect to a user according to an embodiment of the disclosed technology.

FIG. 2 shows a side elevation view of a cooling system with respect to a user according to an embodiment of the disclosed technology. Vents 400 are shown on the air generator 100. The vents 400 may be used to alter or direct the flow of air generated by the air generator 100.The air generator may employ additional components such as a processor and memory. The memory may store instructions that cause the processor to execute a method. The method may be carried out, not necessarily in the following order, by: a) detecting whether the air generator needs to be activated, wherein the detection is made when the temperature reaches a threshold level as detected by the temperature sensing unit in the air generator, and it is detected that a object is within a specified distance to the air generator; b) turning on the air generator, after detection that the temperature reaches a certain level; and it is detected that the object is within the specified distance; and/or c) adjusting the air generator such that the movable air vent directs air flow away from the object. In a further embodiment, a position of the object is constantly monitored and air flow is maintained in a direction away from the object.

Figure 3:
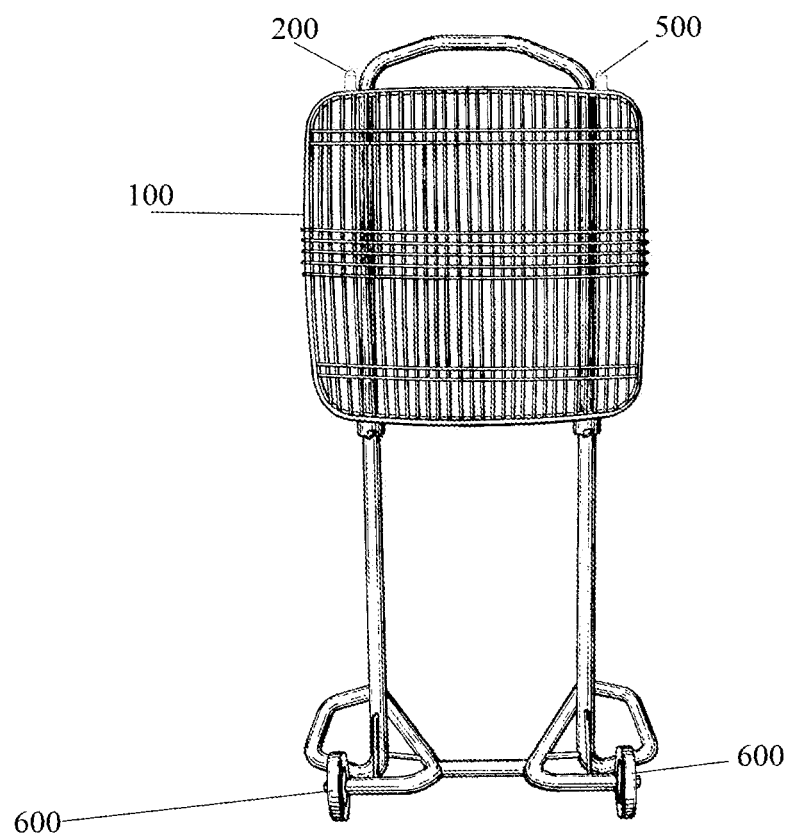
FIG. 3 shows a front elevation view of a cooling system according to an embodiment of the disclosed technology.

FIG. 3 shows a front elevation view of a cooling system according to an embodiment of the disclosed technology. Wheels 600 are rotationally affixed to a portion of the air generator 100. The wheels 600 may be activated and steered by an on-board motor and/or power supply (not shown) in order to move the air generator 100 as desired.

As such, additional steps may be carried out by: a) detecting that the object has moved to another location that is in the direction of air flow; and b) using the set of wheels to move the air generator such that the movable air vent of the air generator is directed away from the object. Alternatively, further steps may proceed by: a) detecting that the object has exited a specified proximity or area; and b) returning the air generator to the default position using the position device in the air generator.

Figure 4:
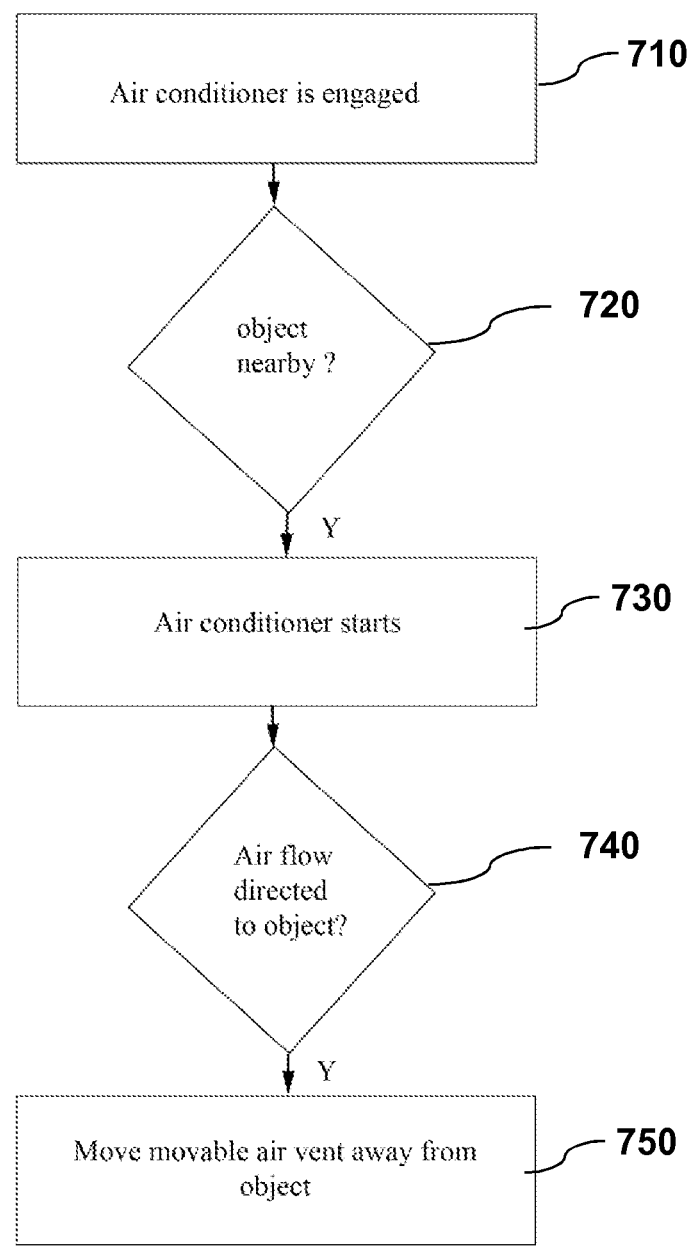
FIG. 4 shows a flow diagram of steps taken in a method according to one or more embodiments of the disclosed technology.

FIG. 4 shows a flow diagram of steps taken in a method according to one or more embodiments of the disclosed technology. In the first step 710, the air conditioner is engaged or powered on. That is, this step may involve the air conditioner being switched on or power being supplied thereto. The next step 720 asks determines whether an object (person, animal, living thing) is nearby. The sensors of the system may be configured for different uses. For example, the sensors may be set to only detect human beings. In this example, a moving object or thing larger than, for instance, 3 feet, may be sufficient to trigger the sensors. If the object is detected, the air conditioner may be started in the next step 730.

The method proceeds in step 740 by asking whether the air flow is being directed to the object. If so, in step 750 the direction of the air vent may be altered to change the direction of airflow. Alternatively, the entire air generator may be moved via the accompanying wheels to an entirely different position.

Figure 5:
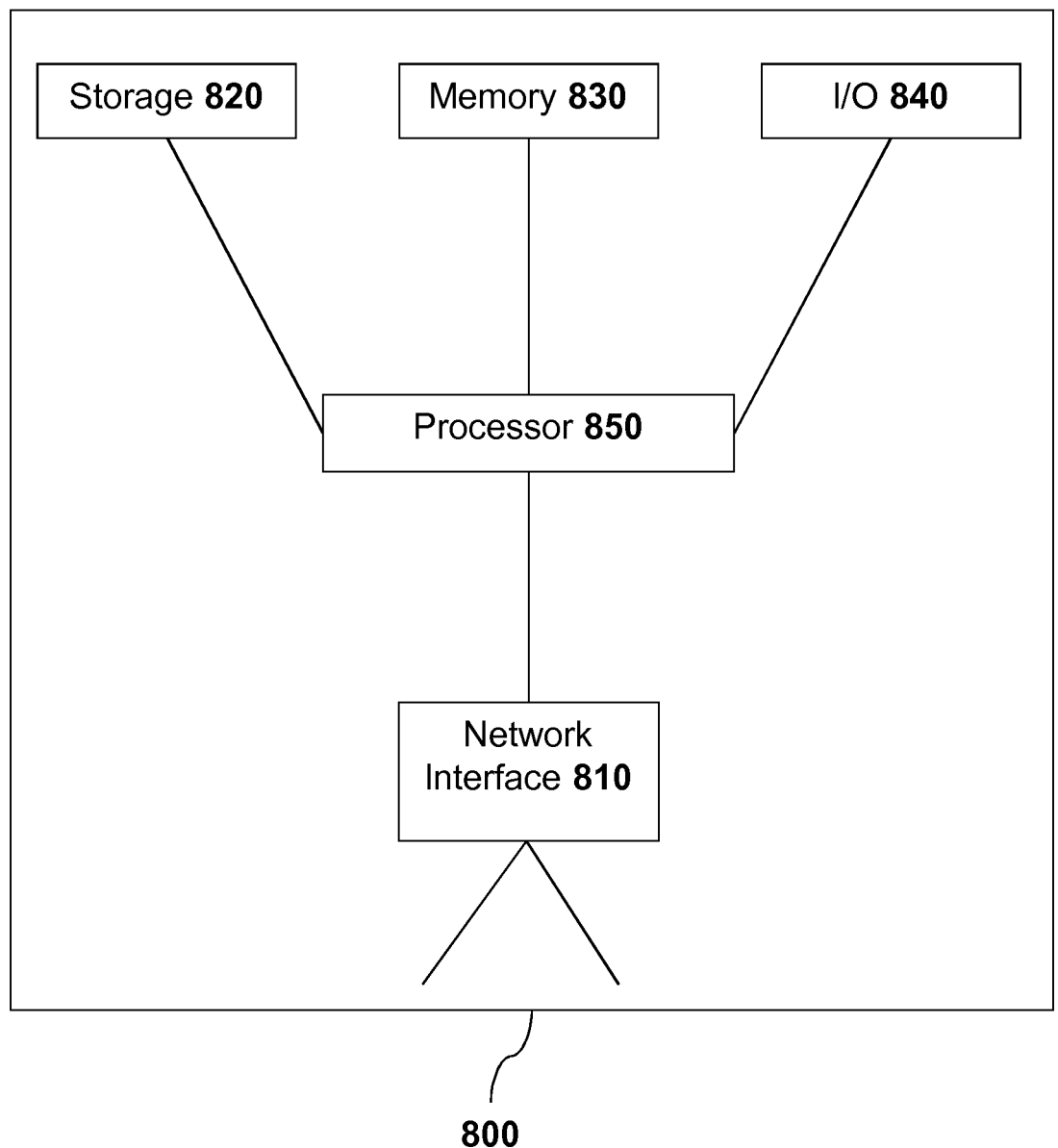
FIG. 5 is a high-level block diagram of a microprocessor device that may be used to carry out the disclosed technology.

FIG. 5 is a high-level block diagram of a microprocessor device that may be used to carry out the disclosed technology. The device 800 may or may not be a computing device. The device 800 comprises a microchip (also referred to as "a smart chip") and/or processor 850 that controls the overall operation of a computer by executing the reader's program instructions which define such operation. The device's program instructions may be stored in a storage device 820 (e.g., magnetic disk, database) and loaded into memory 830 when execution of the console's program instructions are desired. Thus, the device's operation will be defined by its program instructions stored in memory 830 and/or storage 820, and the console will be controlled by the processor 850 executing the console's program instructions.

The device 800 may also include one or a plurality of input network interfaces for communicating with other devices via a network (e.g., the internet). The device 800 further includes an electrical input interface for receiving power and data from a power or wireless data source. The device 800 may also include one or more output network interfaces 810 for communicating with other devices. The device 800 may also include input/output 840 representing devices which allow for user interaction with a computer (e.g., display, keyboard, mouse, speakers, buttons, etc.).

One skilled in the art will recognize that an implementation of an actual device will contain other components as well, and that FIG. 5 is a high level representation of some of the components of such a device for illustrative purposes. It should also be understood by one skilled in the art that the devices depicted and described with respect to FIGS. 1 through 4 may be implemented on a device such as is shown in FIG. 5. Thus, the device 800 of FIG. 5 may describe the inner workings of the cooling system 100 of FIGS. 1 through 4 and/or any of its corresponding components.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

The invention claimed is:

1. An air-conditioning system for generating air flow in directions away from objects to prevent the objects from being directly hit with airflow, comprising:
   an air generator having a temperature sensing unit;
   a position device in the air generator, wherein the position device is used to:
      identify its current position;
      remember a default position; and
      return the air generator to return to the default position, when the air generator is denied access because of an obstruction;
   a movable air vent attached to the air generator, wherein the movable air vent directs air flow generated by the air generator;
   a tracking sensor associated with the air generator, wherein the tracking sensor is used to:
      keep track of positions of the object, based on temperatures or heat generated by the object; and
      adjust the movable air vent in a direction away from the object; and
   a set of wheels affixed to the air generator, wherein the set of wheels facilitates movement of the air generator in response to movements of the object.

2. The system of claim 1, wherein the temperature sensing unit is an infrared sensor.

3. The system of claim 2, wherein the system further comprises:
   a processor included in the air generator; and
   a memory included in the air generator, wherein the memory stores instructions that cause the processor to execute a method, the method comprising:
      detecting whether the air generator needs to be activated, wherein the detection is made when
         the temperature reaches a threshold level as detected by the temperature sensing unit in the air generator; and
         it is detected that a object is within a specified distance to the air generator;
      turning on the air generator, after detection that the temperature reaches a certain level; and it is detected that the object is within the specified distance; and
      adjusting the air generator such that the movable air vent directs air flow away from the object.

4. The system of claim 3, wherein a position of the object is constantly monitored and air flow is maintained in a direction away from the object.

5. The system of claim 3, wherein the method further comprises:
   Detecting that the object has moved to another location that is still within the specified distance using the tracking sensor; and
   adjusting the air vent of the air generator such that the movable air vent continues to face away from the object and is prevented from rotating to other positions whereby the object would receive the generated air flow.

6. The system of claim 5, wherein the system further comprises:

detecting that the object has moved to another location that is in the direction of air flow; and using the set of wheels to move the air generator such that the movable air vent of the air generator is directed away from the object.

7. The system of claim 6, wherein the method further comprises:

detecting that the object has exited a specified proximity or area; and returning the air generator to the default position using the position device in the air generator.

8. A method for generating air flow in directions away from objects to prevent the objects from directly hit with airflow, comprising:

detecting whether an air generator needs to be turned on, wherein the detection is made when a room temperature reaches a certain level as detected by a temperature sensing unit in the air generator; and it is detected that an object is within a certain distance of the air generator;

turning on the air generator, after detection that the room temperature reaches a certain level; and it is detected that the object is within a certain distance; and adjusting the air generator, so that a movable air vent attached to the air generator is facing away from the object while preventing the air generator from rotating to other positions whereby the object would receive the generated air flow.

9. The method of claim 8, further comprising:

detecting whether the object has moved to another location that is still within the certain distance using a tracking sensor; and upon detection that the object has moved to the another location that is still within the certain distance, adjusting the air vent of the air generator so that the movable air vent will continue facing away from the object while preventing the air generator from rotating to other positions where the object would receive the generated air flow.

10. The method of claim 9, further comprising:

detecting whether the object has moved to a location within a range and direction of the generated air flow; and upon detection that the object has moved, using the set of wheels to move the air generator so that the movable air vent of the air generator is directed away from the object.

11. The method of claim 10, further comprising:

detecting that the object has exited a room and closed a door thereto; and returning the air generator to the default position using the position device in the air generator.

12. The method of claim 10, further comprising:

detecting whether the another location entered is a room whose door has been closed by the object; and if detected that another location entered is the room whose door has been closed, returning the air generator to the default position, by relying on the position device in the air generator; otherwise, adjusting the air generator of the air generator, so that the movable air vent is facing away from the object, without letting the air generator rotates to other positions where the object would receive the generated air flow;

if detected that the another location entered is the room whose door has been closed, returning the air generator to the default position, by relying on the position device in the air generator; otherwise, adjusting the air generator of the air generator, so that the movable air vent is facing away from the object, without letting the air generator rotates to other positions where the object would receive the generated air flow.

* * * * *